United States Patent [19]

Mihara

[11] Patent Number: 4,610,831
[45] Date of Patent: Sep. 9, 1986

[54] METHOD OF CONTROLLING CYLINDER SPEED IN INJECTION MOLDING APPARATUS

[75] Inventor: Takeshi Mihara, Ube, Japan

[73] Assignee: UBE Industries, Yamaguchi, Japan

[21] Appl. No.: 597,231

[22] Filed: Apr. 5, 1984

[30] Foreign Application Priority Data

Apr. 12, 1983 [JP] Japan ................................. 58-63004

[51] Int. Cl.$^4$ ...................... B29C 45/77; B22D 46/00
[52] U.S. Cl. ................................... 264/40.7; 164/457
[58] Field of Search ...................... 425/149; 264/40.7; 164/457

[56] References Cited

U.S. PATENT DOCUMENTS

| | | | |
|---|---|---|---|
| 4,240,996 | 12/1980 | Hunkar | 425/149 |
| 4,248,040 | 2/1981 | Kast | 60/39.27 |
| 4,330,026 | 5/1982 | Fink | 164/457 |
| 4,349,324 | 9/1982 | Neff et al. | 425/149 |
| 4,411,609 | 10/1983 | Yoshii et al. | 425/149 |
| 4,493,362 | 1/1985 | Moore et al. | 164/457 |

*Primary Examiner*—Willard E. Hoag
*Attorney, Agent, or Firm*—Burgess, Ryan & Wayne

[57] ABSTRACT

A method of controlling the speed of a piston in an injection molding or die casting machine utilizing a flow rate change characteristic inherent in a hydraulic pressure circuit including a cylinder and a flow rate adjusting valve. The characteristic effects the operation delay due to the compressibility and inertia of the oil and other factors, in changing the speed or the flow rate of a operation oil from a lower value to a higher value. The characteristic is formulated in time or piston stroke expressed by a function of the speed or the flow rate between the lower and higher values under an actuation pattern of the valve in which the valve opening is forced to change at a constant velocity. A flow rate adjusting signal to actuate the valve is emitted with an advanced timing calibrated in the time or the piston strokes, which timing is computed by a computer based on the characteristic function at a predetermined valve actuation pattern with predetermined lower and higher speeds and a predetermined stroke at the higher speed being given as inputs to compensate for the operation delay.

4 Claims, 16 Drawing Figures

CAVITY FILING REGION

METHOD OF CONTROLLING CYLINDER SPEED IN INJECTION MOLDING APPARATUS

BACKGROUND OF THE INVENTION

1. Field of the Invention

The present invention relates to a method of controlling the speed of a piston in an injection molding apparatus such as a die casting machine or an injection molding machine.

2. Description of the Prior Art

A conventional injection molding apparatus with a mechanism for controlling the speed of the piston in an injection cylinder includes an injection cylinder and an injection plunger, for casting a molten metal into a mold, connected to a piston rod of the injection cylinder through a coupling. A striker is connected integrally to the piston rod or coupling to turn on and off a limit switch. A signal of the limit switch is put in a limit switch signal detector. A system for detecting the position of the plunger is constructed by the above-mentioned striker, limit switch, and limit switch signal detector. A signal from the limit switch signal detector is put into a control signal generating system. When the injection plunger arrives at a predetermined position, the flow rate adjusting valve is opened or closed to a degree corresponding to a predetermined value set in advance in the adjusting signal generating system by a speed setting device.

It has hithertofore been known that there is a certain time delay between the point of actuation of the limit switch and the point of the start of the operation of a movable part of the flow rate adjusting valve, such as a spool. Namely, it has been considered that when a relay in a control panel is actuated in succession, electric and mechanical delays or time deviations due to delays of electric signals and operation delays of the flow rate adjusting valve are caused. In fact, when a solenoid is actuated, it takes a certain time exceeding a predetermined time for the movable part, such as the spool, to start the operation. There are deviations of this delay time and there are also deviations of the stroke of the movable part. In a conventional apparatus, in fact, when the limit switch is actuated, there is a delay time of about 20 to about 100 msec before the speed of the piston begins to change. It has conventionally been considered that this time delay is due only to electric and mechanical delays.

Japanese Utility Model Application No. 57-22, to which U.S. patent application Ser. No. 455.512 corresponds, discloses a special pulse-motor-driven flow rate adjusting valve designed to minimize electric and mechanical delays. This delay is included in an operation delay described later. According to this technique, the electric and mechanical delays for the start of opening of a spool of this special flow rate adjusting valve after the actuation of the limit switch can be controlled through a microprocessor to less than 1 msec.

When experiments were carried out using this apparatus, however, it was found that when this flow rate adjusting valve was actuated, there was still a time delay of about 10 to about 50 msec before the piston speed began to change. It was found that this time delay was caused by the inertia of the mechanical portion and operation oil, which requires time for acceleration, and also the viscousness and compressibility of the operating oil. This time delay cannot be eliminated. Accordingly, when the injection speed is changed, instructions for controlling the speed should be taking such a time delay into consideration. The operation delay consists of such time delay and the above-mentioned electric and mechanical delays.

This type of control requires continuous adjustment of the timing of instructions for starting operation of the flow rate control valve. According to the conventional technique, this adjustment was mainly determined by perception of individual workers as complicated measurement operations would otherwise be necessary. While this has been possible in the past, recently, shapes of molded articles have become more complicated, and improvement and standardization of quality have become necessary. Accordingly, delicate and highly precise adjustment is needed.

SUMMARY OF THE INVENTION

It is an object of the present invention to achieve control of piston speed in an injection molding apparatus taking into consideration the operation delay, particularly the above-mentioned unavoidable time delay and, thereby, to obtain a predetermined piston speed precisely at a predetermined piston stroke.

According to the present invention, there is provided a method of controlling the speed of a piston in an injection molding or die casting apparatus having a cavity to be filled with a melt due to actuation of the piston and a hydraulic pressure circuit including the cylinder and a flow rate adjusting valve to be actuated by a flow rate adjusting signal. The valve is provided for adjusting the flow rate of an operation oil supplied to or discharged from the cylinder so that the speed is forced to change to a desired value under an actuation pattern of the valve. In an actuation pattern the valve opening is forced to change at a constant velocity. The flow rate change characteristic, exhibited inherently in the hydraulic circuit to the effect that operation delay occurs in changing the speed of the flow rate so as to start from a lower value and terminate at a higher value, is formulated in time expressed, under a predetermined actuation pattern of the valve, by a function of at least the speed or the flow rate between the lower and higher values as a parameter. The signal is emitted with an advanced timing relative to the moving piston stroke. This timing is computed based on the characteristic function with predetermined higher and lower flow rates or speeds and a predetermined stroke at the higher speed given as inputs to compensate for the operation delay. Thus, the speed is changed to terminate at the predetermined value at the predetermined stroke.

The timing for emitting the signal is set and may be calibrated in time or a function thereof. The characteristic function may be converted to a function of the stroke in place of time, provided that the timing for emitting the signal is set in strokes or a function thereof. The characteristic is preferably formulated in time or strokes expressed by a function of parameters further including the valve actuation pattern, the pressure and/or the temperature. In this case, when such additional parameter is changed, the timing for emitting the signal is computed based on the characteristic function with the original value of the parameter and the changing value as additional inputs so as to compensate for the parameter change. The step of filling the cavity with the melt, which corresponds to the latter half of one injection stroke of the piston, is mainly controlled in speed according to the present invention mentioned above. The valve is preferably a directly driven type valve comprising an actuator operated by a pulse signal and an opening degree adjusting spool connected mechanically to the actuator.

BRIEF EXPLANATION OF THE DRAWINGS

Other objects and advantages of the present invention will be apparent from the following description made in reference to the accompanying drawings, in which.

DESCRIPTION OF THE PREFERRED EMBODIMENTS

Before describing the preferred embodiments, an explanation will be given of the prior art for reference purposes.

Figure 1:
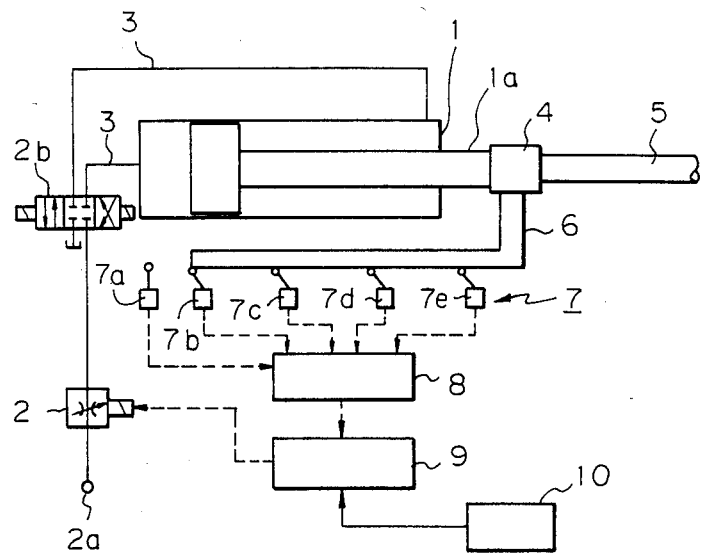
FIG. 1 is a block diagram of a conventional apparatus similar to an apparatus used with the present invention.

FIG. 1 illustrates an injection cylinder of a standard die casting machine and a mechanism for controlling the speed of the piston. In FIG. 1, reference numeral 1 represents an injection cylinder. An injection plunger 5 for casting a molten metal into a mold (not shown) is connected to a piston rod 1a of the injection cylinder 1 through a coupling 4. A striker 6 is connected integrally to the piston rod 1a or coupling 4 to turn on and off a limit switch 7 (indicated by 7a to 7e). A signal of the limit switch 7 is put in a limit switch signal detector 8. A system for detecting the position of the plunger is constructed by the above-mentioned striker 6, limit switch 7, and limit switch signal detector 8.

A signal from the limit switch signal detector 8 is applied to a control or adjusting signal generating system 9. When the injection plunger 5 arrives at a predetermined position, the flow rate control valve 2 is opened or closed to a degree corresponding to a predetermined value set in advance in the control signal generating system 9 by a speed setting device 10. The flow rate adjusting valve 2 is connected to the injection cylinder 1 through a hydraulic pressure circuit 3 which includes a solenoid valve 2b for actuating the plunger in the injection cylinder 1 to move forwardly and rearwardly, and the amount of a liquid (oil) introduced into the injection cylinder 1 is adjusted according to the opening or closing degree of the flow rate adjusting valve 2 to perform the control of the speed of the plunger in the injection cylinder 1. Reference numeral 2a represents a hydraulic pressure source.

Figure 2:
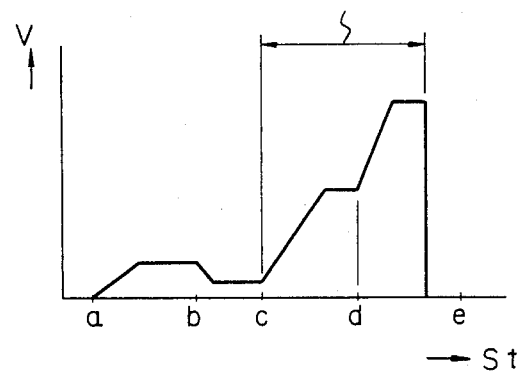
FIG. 2 is a graph of an example of the relation between the stroke of an injection piston and the injection speed.

FIG. 2 shows the case where the speed of the plunger in the injection cylinder 1 is changed by the system for controlling the speed of the plunger, shown in FIG. 1. In FIG. 2, the stroke St of the injection plunger is plotted on the abscissa and the injection speed V is plotted on the ordinate. Furthermore, symbols a through e in FIG. 2 correspond to the positions 7a to 7e of the limit switch 7 shown in FIG. 1.

Figure 3:
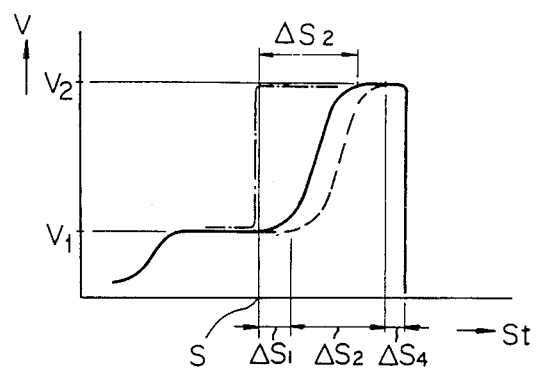
FIG. 3 is a graph of the state of speed change.

FIG. 3 illustrates in detail the cavity filling region shown in FIG. 2. FIG. 3 shows the state where at the point of the stroke S, for example, 7d of the limit switch 7 shown in FIG. 1 is actuated and the speed of the injection plunger is changed to V2 from V1. However, since a certain time is required for the flow rate adjusting valve 2 to open to a predetermined opening degree even if the operation of the flow rate adjusting valve 2 is started at the point of the stroke S, the speed V1 is not instantaneously changed to V2 as indicated by a dot-dash chain line in FIG. 3, but the speed V2 is attained after stroke displacement ΔS2 as indicated by a solid line in FIG. 3. When the change ΔS of the speed of the injection cylinder 1 is actually measured, it is seen that, as shown in FIG. 3 by a dotted line, even if the operation of the flow rate control valve 2 is started at the point of the stroke S, displacement ΔS1 is first made while maintaining the speed V1 and then, the speed rises. This stroke displacement ΔS1 indicates the region of the delay that cannot follow the rapid opening or closing of the flow rate control valve 2 because of the inertia and compressibility possessed by the operation oil as the control medium and the piston system.

Figure 4:
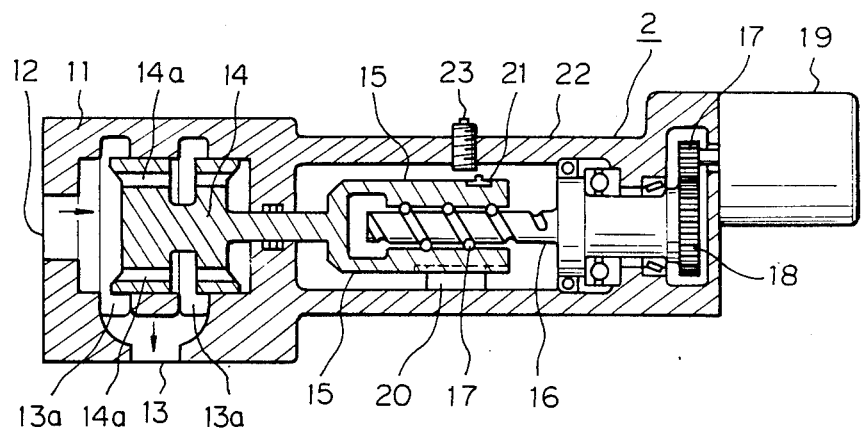
FIG. 4 is longitudinal sectional view of special pulse-motor-driven flow rate control valve.

FIG. 4 shows the pulse-motor-driven flow rate control valve in which mechanical and electrical delays were substantially eliminated and with which the present invention can be applied. In FIG. 4, reference numeral 2 represents a flow rate adjusting valve; 11 a valve body having an inlet 12 for introduction of an operating oil from the axial direction and an outlet 13 forming circumferential grooves 13a for discharging the operation oil in a direction perpendicular to the axis; 14 a valve spool, having axial through-holes 14a, which is movable in the valve body 11 in the axial direction; 15 a nut shaft connected integrally to the rear portion of the valve spool 14; 16 a screw shaft screwed through a ball screw to the inner axis portion of the nut shaft 15; 17 a pinion gear engaged with a rear gear 18 of the screw shaft 16; 19 a pulse motor in which the rotation quantity can be controlled; and 20 a key.

According to the rotation of the pulse motor 19, the valve spool 14 is moved forward or backward in the axial direction to simultaneously effect opening or closing of the valve and adjustment of the opening degree of control of the flow rate.

As mentioned above, this flow rate adjusting valve comprises the cylindrical valve body 11 having the operation oil inlet 12 on the end face in the axial direction and the operation oil outlet 13 on the side face. In this valve body 11, the valve spool 14 is driven in the axial direction by the action of the pulse motor 19 to effect the control of the flow rate. In this flow rate adjusting valve, the force of propelling the value spool 14 in the axial direction by the operation oil is abruptly decreased according to the increase of the opening quantity and moving speed of the valve spool 14 to reduce the driving force necessary for the high-speed change of the flow rate, whereby the capacity of the high-speed change of the flow rate by the flow rate adjusting valve is further improved and the driving force is retained.

A permanent magnet 21 is secured to a part of the surface of the nut shaft 15. A position sensor 23 utilizing magnetic action, for example, a so-called zero cross sensor, is attached to a part of a casing 22 to confront this permanent magnet 21. The position sensor 23 is constructed by a proximity switch responsive to the movement of the permanent magnet 21. The distance of the movement of the nut shaft 15 or valve spool 14 in the axial direction is precisely detected by the position sensor 23, and the detection data are fed back to the control system. Furthermore, the zero position of the valve spool 14 is electrically detected by the action of the permanent magnet 21 and position sensor 23. The pulse motor 19 is controlled by the control system to maintain this position precisely. A detector having a precision of 0.01 mm is used as the position sensor 23.

As seen from FIG. 3, in order for the speed of the plunger to change from V1 to V2, it is necessary for the injection plunger to make a displacement of $\Delta S1 + \Delta S2$ from the point of stroke S. The stroke region where the movement is actually performed at the speed V2 before completion of the injection is only $\Delta S4$. In this case, if it is intended to control the change of the speed of the injection plunger, one condition for casting of a molded article, by the position (stroke) of the plunger in the cylinder, control becomes unstable.

As is seen from FIG. 3, if it is intended to make the position of rising of the speed from V1 to V2 in agreement with the position S, the position for giving instructions for starting the operation to the flow rate control valve 2, for example, the operation position of the limit switch 7d, should be adjusted forward by a quantity corresponding to the above delay. As mentioned earlier, however, this is difficult.

The present invention will now be described in detail with reference to preferred embodiments.

Figure 5:
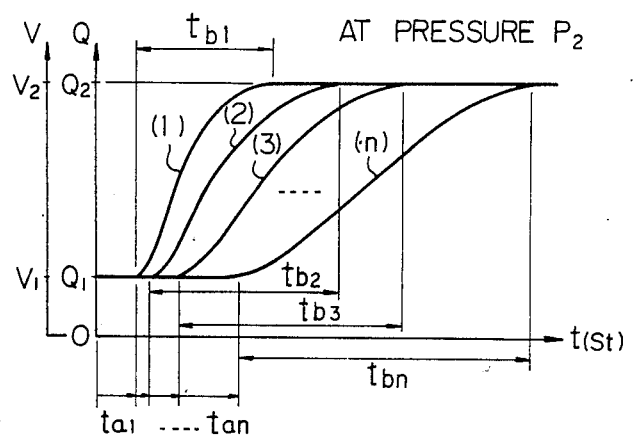
FIGS. 5 and 6 are graphs of patterns of flow rate or speed change at various actuation patterns of valve and various pressures in the present invention, respectively.

FIG. 5 shows the flow rate change or speed change characteristic at a constant pressure P2 of a hydraulic pressure circuit comprising a cylinder flow rate adjusting valve and a hydraulic cylinder. The flow rate Q or plunger speed V is plotted on the ordinate and the time t is plotted on the abscissa (the stroke St may be plotted on the abscissa). At the point of t=0, a flow rate adjusting signal is given or emitted to the flow rate adjusting valve 2.

As shown in FIG. 5, a one-to-one relation is established between the flow rate Q in the hydraulic pressure circuit system and the plunger speed V. The state where the flow rate changes to Q2 from Q1 and the speed changes to V2 from V1 is shown. Loci (1), (2), ... and (n) indicate differences of the opening or closing degree of the valve body of the flow rate adjusting valve 2.

Even if the opening degree of the flow rate adjusting valve 2 is the same, for example, when the valve body is opened at a slow speed, the flow rate change characteristic can be changed from the pattern (1) toward the pattern (n) in FIG. 5. Supposing that the characteristic of the pattern (1) is selected and adopted, a time ta1 is necessary for the flow rate or speed to rise after the flow rate adjusting valve 2 is opened, and a time tb1 is necessary for the flow rate or speed to reach a predetermined level Q2 or V2 after rising. Accordingly, in order to control the rising point of the plunger speed, it is sufficient if opening instructions are given to the flow rate adjusting valve 2 before the time ta1. In order to maintain the stroke movement quantity of the plunger in the cylinder at the intended speed of the plunger, it is sufficient if opening instructions are given to the flow rate adjusting valve 2 before the time (ta1+tb1).

Figure 6:
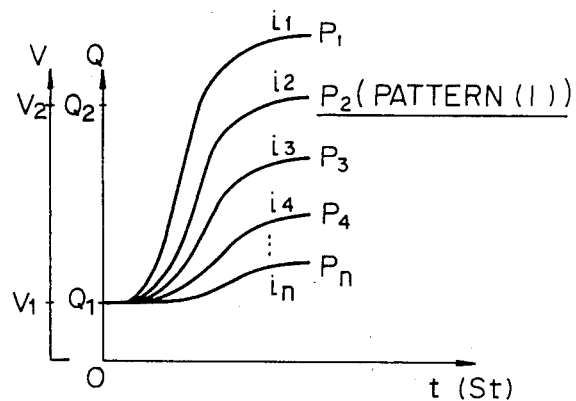

FIG. 6 shows the flow rate change characteristics observed when the hydraulic pressure is changed while the pattern of the opening degree of the flow rate adjusting valve is kept constant and the hydraulic pressure is lowered from P1 toward Pn. In FIG. 6, under a pressure lower than P3, the flow rate or plunger speed cannot be elevated to Q2 or V2. At the pressure P2, a desired value of the flow rate Q2 or the speed V2 is obtained.

As is apparent from the foregoing description and FIGS. 5 and 6, tai (i=1, 2, ... n) and tbi (i=1, 2 ... n) differ according to the present flow rate Q1 or speed V1, the aimed flow rate Q2 or speed V2, the pattern i (i=1, 2, ... n) of the opening degree of the flow rate adjusting valve, and the hydraulic pressure Pj (j=1, 2, ... n) of the hydraulic pressure circuit system. They are ordinarily expressed by such functions as tai=f1 (Q1, Q2, i, Pj)=f2 (V1, V2, i, Pj) and tbi=f3 (Q1, Q2, i, Pj)=f4 (V1, V2, i, Pj).

The relations of the pattern i of the opening degree of the flow rate adjusting valve to the time ta1 required for the flow rate or speed just before rising after the start of opening of the flow rate adjusting valve and the time tb1 required for attainment of the predetermined flow rate Q2 or speed V2 after the start of the rising of the flow rate or speed will now be described.

If the hydraulic pressure Pj of the hydraulic pressure circuit system is constant, the value of tc=(ta+tb) required for attainment of the predetermined flow rate Q2 or speed V2 after the start of opening of the flow rate adjusting valve is naturally determined if the pattern i (i=1, 2, ... n) is determined.

Figure 7:
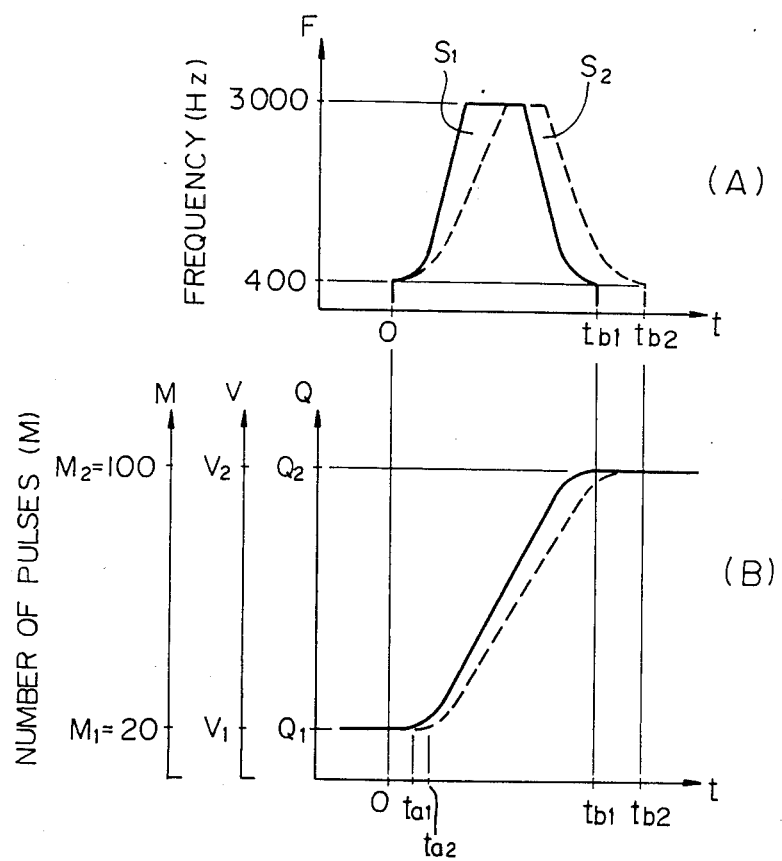
FIG. 7(A) is a time-frquency curve of pulses oscillated when the opening quantity of the flow rate adjusting valve is changed.
FIG. 7(B) is a graph of the relation between the time required for opening the flow rate adjusting valve and the flow rate of injection speed.

If the structure of the flow rate adjusting valve 2 used in the present invention is determined, the relation between the opening quantity of the flow rate adjusting valve 2 in the range of from the start of the desired small opening to the start of the desired large opening or the opening quantity of the flow rate adjusting valve in the range of from the closed state to the start of the desired opening, that is, the number M of pulses to be put in the pulse motor 19 of the flow rate adjusting valve 2, and the flow rate Q or speed V obtained by this flow rate adjusting valve 2, is naturally determined and is expressed, for example, by FIG. 7(B). Of course, in this case, the relation between the time t and the flow rate Q or speed V is as expressed by the curve of FIG. 7(B). In FIG. 7(B), the curve of the solid line is different from the curve of the dotted line with respect to pattern i.

In the case where it is intended to establish the relation indicated by the solid line curve of FIG. 7(B) in a predetermined flow rate adjusting valve 2, when the opening quantity of the valve is changed from the point where the valve is slightly opened and the flow rate Q1 or speed V1 is obtained to the point where the valve is greatly opened and the flow rate Q2 or speed V2 is obtained, a relation shown by, for example, the curve of a solid line in FIG. 7(A) is established between the time t when the pulse is put in the pulse motor 19 and the frequency Hz of the pulse. In the case where it is intended to establish the relation indicated by the dotted line curve of FIG. 7(B) in the same flow rate adjusting valve 2, a relation indicated by a dotted line in FIG. 7(A) is established between the time t required for changing the flow rate Q1 or speed V1 to the flow rate Q2 or speed and the pulse frequency Hz. In this case, the area of the portion surrounded by the curve of FIG. 7(A) shows the total number of the generated pulses, that is, the difference of the opening quantity of the valve, and the area S1 defined by the solid line curve is equal to the area S2 defined by the dotted line curve.

In this case, an arrangement is made so that the longer the pulse oscillation time, the smaller the width of the maximum value of the pulse frequency Hz. If the area S1 defined by the solid line is equal to the area S2 defined by the dotted line, not only the width of the maximum value of the frequency Hz but also the maximum value of the frequency Hz can be changed.

Supposing in order to change the injection speed to V2 from V1, as shown in FIG. 7(B), it is necessary to change the opening quantity of the valve, that is, the pulse number M from M1 to M2, pulses of the number corresponding to $\Delta M = M2 - M1$ should be put into the pulse motor 19. In this case, the time required for obtaining the difference of the opening quantity of the valve, that is, the time required for oscillating the above-mentioned number of pulses to be put in the pulse motor 19, is determined by the pattern i.

Figure 8:
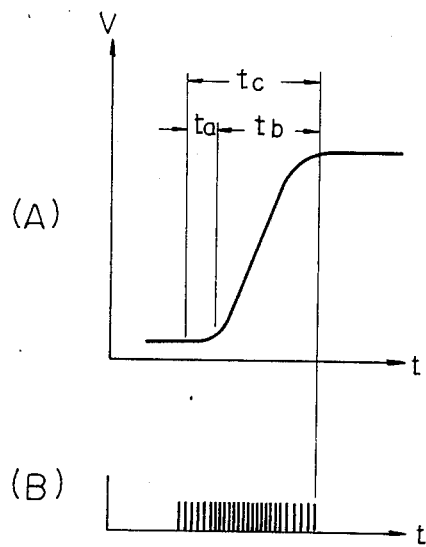
FIG. 8(A) is another graph of the state of speed change.
FIG. 8(B) is a graph of the state of oscillating pulses.

The curve for changing the injection speed in this case and the times ta, tb, and tc are shown in FIG. 8(A). The state of oscillation of pulses in this case is shown in FIG. 8(B). When the injection speed is changed, as shown in FIGS. 8(A) and 8(B), the point of completion of transmission of pulses is in agreement with the point of completion of the change of the speed. This is a flow rate or speed change characteristic confirmed by the inventor of the present invention by experiments. Accordingly, if the difference $\Delta M$ of the pulse number corresponding to the difference of the opening quantity of the valve is known, the time for putting out the pulses can be simply calculated by computer built into the control system and the time tc can be known.

Figure 9:
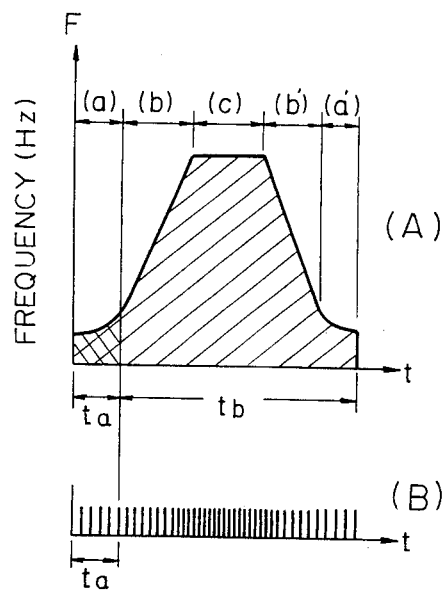
FIG. 9(A) is a graph of the relation between time and the frequency observed when pulses are oscillating.
FIG. 9(B) is another graph of the state of oscillating pulses.

The proportions of the time ta and time tb are substantially as shown in FIGS. 9(A) and 9(B).

In the time-frequency curve shown in FIG. 9(A), the pattern i consists of exponential function portions (a) and (a'), linear function portions (b) and (b'), and a constant frequency portion (c). In the exponential function portion (a), the pulse motor is gradually driven because stepout or vibration is caused if the pulse motor in the stationary state is abruptly rotated. The actual increase of the injection speed is determined by the gradient of the linear function portion (b) and the frequency Hz of the constant frequency portion (c).

Incidentally, each of the portion (b) of rising of the frequency Hz and the portion (b') of falling of the frequency Hz is arranged so that it is expressed by an exponential function. This function, however, is not particularly critical, and each portion may be expressed by a function similar to a linear function.

In FIGS. 9(A) and 9(B), the portions (a) and (b) indicate patterns of the region where the acceleration is increased and the portions (b') and (a') indicate patterns of the region where the acceleration is reduced. These patterns can be selected irrespective of each other. Incidentally, in FIG. 9(A), the area of the portion corresponding to the time (ta+tb) indicates the difference of the total pulse number.

When the speed is changed according to the pattern shown in FIG. 9(A), pulses are oscillated in the state shown in FIG. 9(B). By experiments, the inventor of the present invention confirmed that the exponential function portion (a) shown in FIG. 9(A) corresponds to the delay time ta required for the flow rate or speed to rise after the start of opening of the flow rate adjusting valve.

From the foregoing description, it will readily be understood that the time ta1 and ta2 can be determined according to the selection of the pattern i. Namely, if the pattern i is appropriately selected and numbers of pulses corresponding to the opening quantities of the valve are put in the pulse motor, the pattern of the frequency is determined and the time ta1 and tb1 are determined based on the frequency pattern.

The relations of the hydraulic pressure Pj of the hydraulic pressure circuit system to the time ta and the time tb will now be described.

Supposing that the pressure P2 shown in FIG. 6 is adopted as the standard pressure P, the times taj and tbj required for changing the opening quantity of the valve under the hydraulic pressure Pj are expressed based on the times ta2 and tb2 required for changing the opening quantity of the valve under the pressure P2 as follows:

$$taj = ta2 \cdot k \sqrt{P2/Pj} \text{ and } tbj = tb2 \cdot k \sqrt{P2/Pj}$$

wherein k is a constant

Accordingly, the times ta and tb required for changing the opening quantity of the valve can be easily calculated according to the change of the hydraulic pressure Pj by a computer built into the control system.

The times ta1 and tb2 are thus determined and opening instructions are given to the flow rate adjusting valve based on these times ta1 and tb2.

Figure 10:
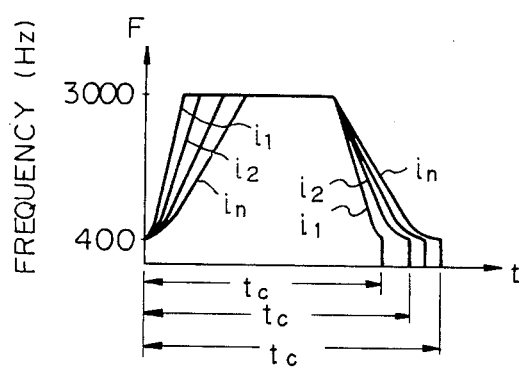
FIG. 10 is a time-frequency curve showing patterns of the state of oscillating pulses.

When the intended control is performed, there may be adopted a method in which the control is conducted steplessly based on the above-mentioned sequential predetermined functions. Furthermore, there may be adopted a control method in which the region for the control of the flow rate is set in advance, the region is divided into a plurality of sections, and data of ta1 and ta2, etc. are retained stepwise. In this case, an emission pattern to be stored in the computer is, for example, as shown in FIG. 10.

For example, in the case where a low injection speed, that is a plunger speed of 0.1 to 0.2 m/sec is changed to a high injection speed of 1 to 5 m/sec in a die casting machine, in a very short time of 20 to 60 msec, the pulse frequency is changed from 400 Hz to 3,000 Hz, and the time required for changing the speed from the low speed to the high speed, that is, the time tc of from the point of the start of transmission of pulses to the point of the completion of transmission of pulses, which is necessary for changing the speed, is adjusted, for example, to 50 to 70 msec. More specifically, tc is adjusted to 50 msec in case of the pattern i1 and tc is adjusted to 70 msec in case of the pattern in. For example, about 10 of these patterns i are put in the computer.

Figure 11:
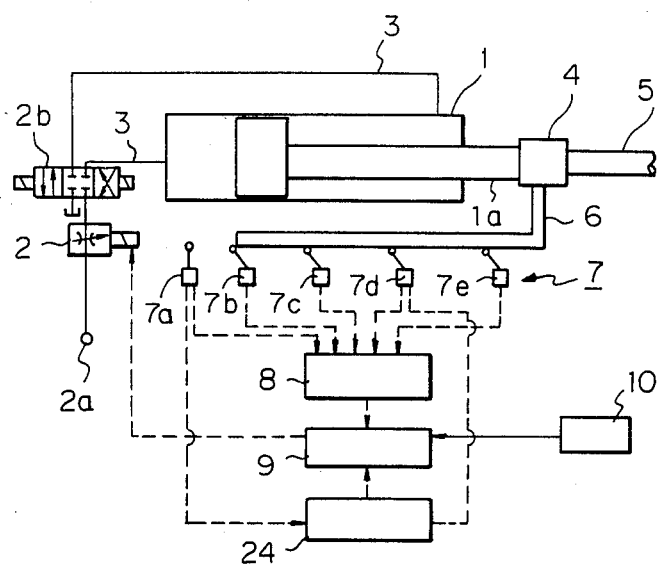
FIG. 11 is a block diagram of an embodiment of an apparatus to be used with the present invention.

FIG. 11 shows another embodiment in which the injection plunger speed is controlled according to the above-mentioned controlling method. In this embodiment, the control is applied to the final speed portion of the cavity filling region.

Figure 12:
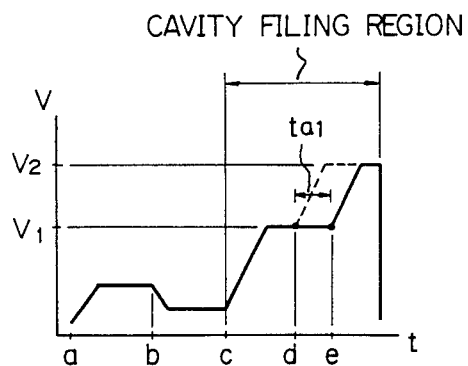
FIGS. 12 and 13 are graphs of the state of changing the rising point of the speed.
Figure 13:
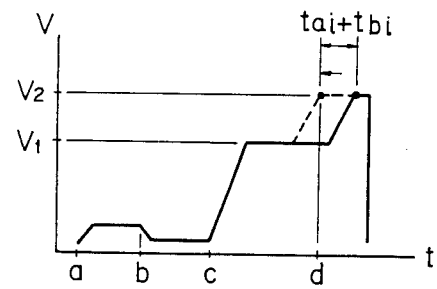

In FIG. 11, reference numerals 1 to 10 represent the same members as shown in FIG. 1. Reference numeral 24 represents a correcting speed signal generating system provided with a time counting faculty and a function of determining tai and tbi. In this embodiment, casting is first carried out according to the ordinary speed control method. The time count is started by the limit switch 7a and is stopped by the limit switch 7d. The time td required for this time count is measured by the correcting speed signal generating system 24. In subsequent casting, tai and tbi are determined from preset values of V1, V2, i, and Pj. If the position for rising of the speed is grasped as shown in FIG. 12 and the speed section of the intended speed V2 is grasped as shown in FIG. 13, opening intructions are given to the flow rate adjusting valve 2 at the point td−(tai +tbi).

Figure 14:
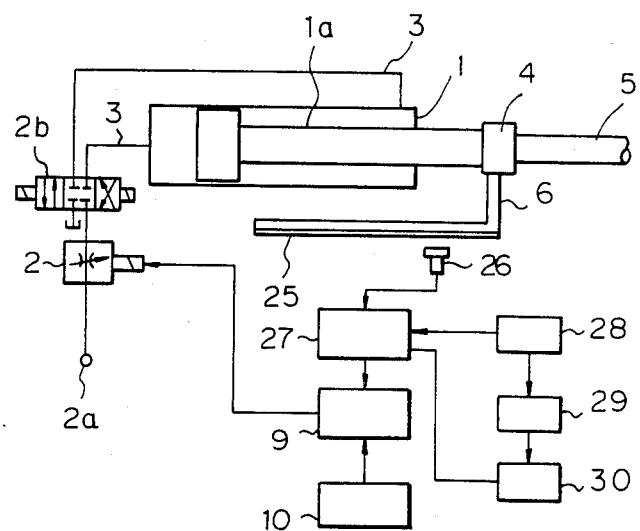
FIG. 14 is a block diagram of another embodiment of an apparatus to be used with the present invention.

FIG. 14 shows still another embodiment, in which the speed control is performed by converting the above-mentioned correcting times tai and tbi to stroke quantities. In FIG. 14, reference numerals 1 to 10 represent the same members as shown in FIGS. 1 and 11. Reference numeral 25 represents a magnetic scale mounted on the striker; 26 a detection head; 27 a discriminator for determining whether or not the input from the detection head is in agreement with a set value of a speed change position setting device 28; 29 a correcting system for instructing tai and tbi; and 30 a system for conversion to strokes. When the discriminator 27 determines whether or not the signal detected by the magnetic scale 25 and the detection head 26 is in agreement with the position set by the speed change position setting device 28, the control signal generating system 9 sets the opening degree of the flow rate adjusting valve 2 according to a predetermined value set in advance by the speed setting device 10. Data of tai and tbi are stored in the correcting system 29 and are converted to stroke quantities by the system 30 for conversion strokes. The position set by the speed change position setting device 28 is corrected to transmit opening degree adjusting instructions to the flow rate adjusting valve 2.

Figure 15:
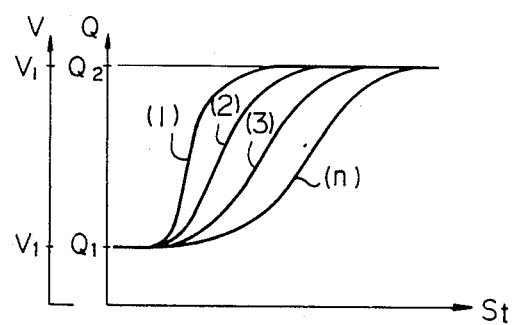
FIG. 15 is another graph of patterns of speed change in the present invention.

In FIG. 15, correction data are set in advance as values of strokes. In this case, the system 30 for conversion to strokes can be omitted.

Figure 16:
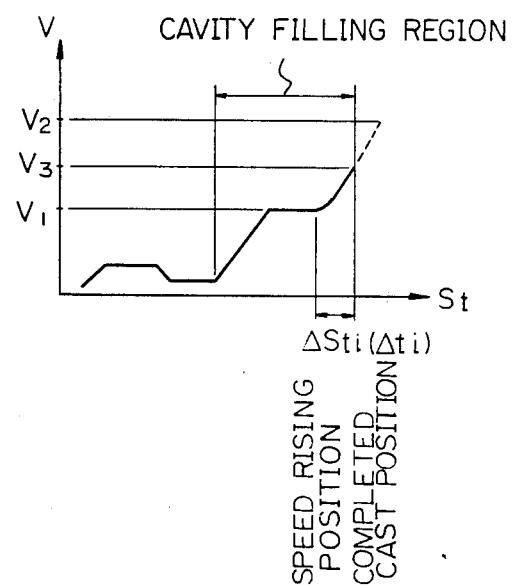
FIG. 16 is a graph of another example of the state of speed change.

FIG. 16 shows another state of the final section of the cavity filling region. In this case, according to the injection conditions, it sometimes happens that the injection speed is not increased to V2 at the point of completion of injection and casting is completed in the transition region where the injection speed is V3, intermediate between V1 and V2.

In this case, the speed change pattern is determined by using V1, V2, V3, i, and Pj, the time Δti or stroke ΔSti of from the point of rising of the speed to the point of completion of casting is obtained, and the operation of the flow rate adjusting valve 2 is started before the stroke ΔSti or time Δti. Namely, as pointed out hereinbefore, only the opening degree adjustment of tai is automatically performed in advance so that the above features are realized. While the speed is being increased according to the selected speed change pattern, casting is completed.

The above-mentioned times tai and tbi may also be expressed by functions including the temperature of the operation as well as the flow rates Q1 and Q2, the speeds V1 and V2, the pattern i of the opening degree of the flow rate adjusting valve 2, and the hydraulic pressure Pj. In normal operation, the temperature of the operation oil is maintained substantially at the same level. Therefore, the temperature of the operation oil need not always be included as a factor into the function. However, in order to successfully cope with an abrupt and great change of the temperature of the oil, it is preferred that the temperature of the oil be included as one factor into the function. When the temperature is elevated, the viscosity of the oil is reduced and the flowability of the oil is increased. Accordingly, the relation of the temperature of the oil to the times tai and tbi is such that the times tai and tbi are shortened with elevation of the temperature.

In the embodiments illustrated in FIGS. 11 and 14, the flow rate adjusting valve 2 is arranged in the hydraulic pressure circuit 3 for supplying the operation oil to the injection cylinder 1 to control the amount of the oil supplied to the injection cylinder 1. There may also be adopted a modification in which the valve 2 is arranged in the line for discharging the oil to the tank from the injection cylinder 1 to control the quantity of the oil discharged from the injection cylinder 1. In each case, the speed of the plunger in the injection cylinder 1 is changed to a desired level by the flow rate adjusting valve 2.

Incidentally, it is preferable that, in the above-mentioned control circuit, the times tai and tbi, the flow rate Q2 or speed V2, and the measured values be compared with values set in an operation panel by an operator or values obtained by calculation by the computer and that controls for the next injection be performed based on the differences obtained by the comparison. In this case, discrimination of the difference is made based on a plurality of threshold values.

If the measured value is different from the set value, the abnormal state is judged and an alarm is produced by a lamp or a buzzer. In the case where the difference between the measured value and the set value is small, the state of the opening of the flow rate adjusting valve is automatically adjusted so that the desired value of the time tai or tbi or the speed, set in advance, can be obtained stably. Alternatively, there may be adopted a method in which if the above-mentioned difference exceeds a predetermined critical difference, for example, a difference of 120 percent, supply of the hydraulic pressure from the hydraulic pressure supply source 2a is stopped to immediately protect the hydraulic pressure circuit system.

Furthermore, it is preferable that, if it is judged at the injection step that the change rate of the time tbi or speed V cannot be changed to the desired value based on the instructed value set according to the above-mentioned difference, the instructed value be changed so that a desired state can be obtained.

As is apparent from the foregoing description, according to the present invention, the delay of rising of the hydraulic pressure circuit system due to the following property of the operation oil by inertia or rising of the flow rate adjusting valve is corrected in transmitting the flow rate adjusting instructions for changing the speed of the plunger. Therefore, the speed of the plunger can be changed at the predetermined point very precisely and easily. Furthermore, the flow pattern of the melt can be controlled precisely. As a result, a cast product having a high quality can be obtained.

Furthermore, if a directly driven type flow rate adjusting valve comprising an actuator operated by a pulse signal, such as a pulse motor, and opening degree adjusting member connected directly to the actuator, such as a valve spool, is used as the flow rate adjusting valve, the operation delay of the valve is greatly reduced. Therefore, the control is simplified and the effect is further enhanced.

I claim:

1. A method for controlling the speed of an injection piston in an injection molding or die casting apparatus of the type including a cylinder within which the piston slides and which is to be filled with a melt, a hydraulic pressure circuit including the piston for casting the melt in the cylinder, and a flow rate adjusting valve having a variable opening actuated by a flow rate adjusting signal for adjusting the flow rate of a liquid used for controlling movement of the piston, the speed of the piston being changed to different desired values at different positions during the molding operation by controlling the flow rate adjusting valve, said method comprising the steps of:

determining delay times occurring in movement of the piston from one speed to another and producing a delay signal in response thereto; and varying the length of stroke of the piston during the injection stroke in response to said delay signal to compensate for said delay times, such that the speed of movement of the piston is changed to predetermined values at predetermined positions during the molding operation.

2. A method as claimed in claim 1, wherein said step of varying the length of stroke includes the step of modifying the flow rate adjusting signal in response to said delay signal.

3. A method as claimed in claim 2, wherein said step of modifying modifies the flow rate adjusting signal further in response to the temperature of said liquid.

4. A method as claimed in claim 1, including directly driving the valve actuator by a pulse signal and adjusting the degree of valve opening by a spool connected mechanically to the actuator, whereby the operation delay is reduced.

* * * * *